US012573134B2

(12) United States Patent
Nakamura et al.

(10) Patent No.: US 12,573,134 B2
(45) Date of Patent: Mar. 10, 2026

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Keisuke Nakamura, Kanagawa (JP); Hiroshi Yamaguchi, Tokyo (JP); Tsuyoshi Ishikawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 180 days.

(21) Appl. No.: 18/012,816

(22) PCT Filed: May 31, 2021

(86) PCT No.: PCT/JP2021/020678
§ 371 (c)(1),
(2) Date: Dec. 23, 2022

(87) PCT Pub. No.: WO2022/004234
PCT Pub. Date: Jan. 6, 2022

(65) Prior Publication Data
US 2023/0252722 A1     Aug. 10, 2023

(30) Foreign Application Priority Data

Jul. 1, 2020    (JP) ................................. 2020-113933

(51) Int. Cl.
*G06T 17/00*          (2006.01)
*G06T 7/70*           (2017.01)
(Continued)

(52) U.S. Cl.
CPC ................ *G06T 17/00* (2013.01); *G06T 7/70* (2017.01); *H04N 5/272* (2013.01); *H04N 13/275* (2018.05); *H04N 13/289* (2018.05)

(58) Field of Classification Search
CPC ......... G06T 17/00; G06T 7/70; H04N 13/275; H04N 13/289; H04N 5/272
See application file for complete search history.

(56) References Cited

U.S. PATENT DOCUMENTS

2005/0062738 A1*   3/2005   Handley ................ B33Y 50/00
                                                                345/419
2010/0315415 A1*  12/2010   Asami ..................... A63F 13/10
                                                                345/419
(Continued)

FOREIGN PATENT DOCUMENTS

CN          108037826  A      5/2018
JP            5483761  B2      5/2014
(Continued)

OTHER PUBLICATIONS

Inter BEE TV [Inter BEE 2016], retrieved from https://www.youtube.com/watch?v=uXgFZgSOiKs, Nov. 17, 2016, pp. 1-2, NHK Science & Technology Research Laboratories (see the translation of International Search Report for concise relevance).
(Continued)

*Primary Examiner* — Michelle Chin
(74) *Attorney, Agent, or Firm* — Paratus Law Group, PLLC

(57)          ABSTRACT

For example, rendering is switchable. There is provided an information processing apparatus including: a first image processing unit that projects a predetermined object onto a two-dimensional plane in a virtual space; and a second image processing unit that renders a three-dimensional model related to a predetermined object at a location that is not the two-dimensional plane in the virtual space, in which at least a first rendering state by the first image processing unit and a second rendering state by the second image processing unit are switchable.

13 Claims, 12 Drawing Sheets

(51) Int. Cl.

| | |
|---|---|
| *H04N 5/272* | (2006.01) |
| *H04N 13/275* | (2018.01) |
| *H04N 13/289* | (2018.01) |

(56) References Cited

U.S. PATENT DOCUMENTS

| | | | | |
|---|---|---|---|---|
| 2012/0094754 | A1* | 4/2012 | Suzuki | A63F 13/655 |
| | | | | 463/43 |
| 2013/0182117 | A1* | 7/2013 | Arseneau | H04N 21/6181 |
| | | | | 348/157 |
| 2017/0228928 | A1 | 8/2017 | Terahata | |
| 2018/0165887 | A1 | 6/2018 | Iwai et al. | |
| 2019/0206142 | A1* | 7/2019 | Ohashi | A63F 13/65 |
| 2020/0192550 | A1* | 6/2020 | Laaksonen | G06F 3/04815 |

FOREIGN PATENT DOCUMENTS

| | | | |
|---|---|---|---|
| JP | 2016-004402 | A | 1/2016 |
| JP | 5996814 | B1 | 9/2016 |
| JP | 6203369 | B1 | 9/2017 |

OTHER PUBLICATIONS

"3D [Tobidasu] TV", Where the Characters in the TV Jump Out of the Screen and Move Around, Gigazine, May 30, 2014, pp. 1-22 (see the translation of International Search Report for concise relevance).

Jun. 29, 2021, Translation of International Search Report issued for related PCT Application No. PCT/JP2021/020678.

* cited by examiner

Figure 10:
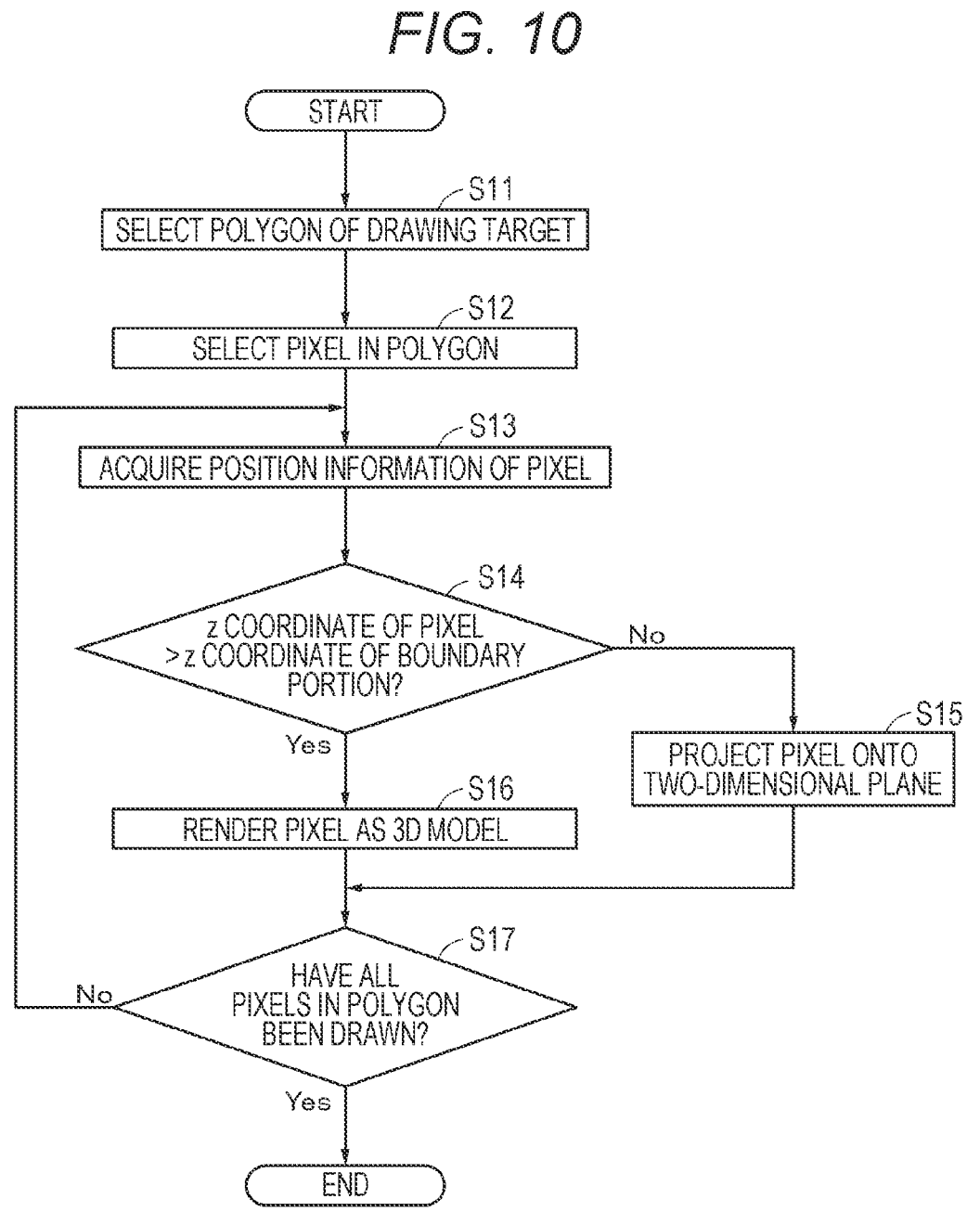

START

SELECT POLYGON OF DRAWING TARGET  ⌐S11

SELECT PIXEL IN POLYGON  ⌐S12

ACQUIRE POSITION INFORMATION OF PIXEL  ⌐S13

S14 z COORDINATE OF PIXEL
> z COORDINATE OF BOUNDARY
PORTION?

No

Yes

PROJECT PIXEL ONTO
TWO-DIMENSIONAL PLANE  ⌐S15

RENDER PIXEL AS 3D MODEL  ⌐S16

S17

HAVE ALL
PIXELS IN POLYGON
BEEN DRAWN?

No

Yes

END

A

B

C

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/020678 (filed on May 31, 2021) under 35 U.S.C. § 371, which claims priority to Japanese Patent Application No. 2020-113933 (filed on Jul. 1, 2020), which are all hereby incorporated by reference in their entirety.

TECHNICAL FIELD

The present disclosure relates to an information processing apparatus, an information processing method, and a program.

BACKGROUND ART

Patent Document 1 discloses a technology of performing display control by classifying an object drawn as a three-dimensional model and an object displayed as a two-dimensional video in units of objects.

CITATION LIST

Patent Document

Patent Document 1: Japanese Patent No. 5483761

SUMMARY OF THE INVENTION

Problems to be Solved by the Invention

In the technology described in Patent Document 1, it is determined whether to draw an object as a three-dimensional model or display an object as a two-dimensional video in units of objects, and thus, for example, it is difficult to perform video representation in which the same object pops out from a two-dimensional plane in a three-dimensional space.

An object of the present disclosure is to provide an information processing apparatus, an information processing method, and a program capable of displaying a predetermined object in different rendering states and switching between the different rendering states.

Solutions to Problems

According to the present disclosure, for example, there is provided an information processing apparatus including:

a first image processing unit that projects a predetermined object onto a two-dimensional plane in a virtual space; and a second image processing unit that renders a three-dimensional model related to the predetermined object at a location that is not the two-dimensional plane in the virtual space, in which at least a first rendering state by the first image processing unit and a second rendering state by the second image processing unit are switchable.

According to the present disclosure, for example, there is provided an information processing method, in which a first image processing unit projects a predetermined object onto a two-dimensional plane in a virtual space, a second image processing unit renders a three-dimensional model related to the predetermined object at a location that is not the two-dimensional plane in the virtual space, and at least a first rendering state by the first image processing unit and a second rendering state by the second image processing unit are switchable.

According to the present disclosure, for example, there is provided a program that causes a computer to execute an information processing method, in which a first image processing unit projects a predetermined object onto a two-dimensional plane in a virtual space, a second image processing unit renders a three-dimensional model related to the predetermined object at a location that is not the two-dimensional plane in the virtual space, and at least a first rendering state by the first image processing unit and a second rendering state by the second image processing unit are switchable.

BRIEF DESCRIPTION OF DRAWINGS

FIG. 10 is a flowchart for explaining an operation example of the information processing apparatus according to the embodiment.

MODE FOR CARRYING OUT THE INVENTION

The following is a description of embodiments and the like of the present disclosure with reference to the drawings. Note that the description will be given in the following order.

US 12,573,134 B2

3

<Technology Related to the Present Disclosure>
<Embodiment>
<Modification Example>
<Application example>

The embodiments and the like described below are preferred specific examples of the present disclosure, and the
content of the present disclosure is not limited to these
embodiments and the like.

Technology Related to the Present Disclosure

Figure 1:
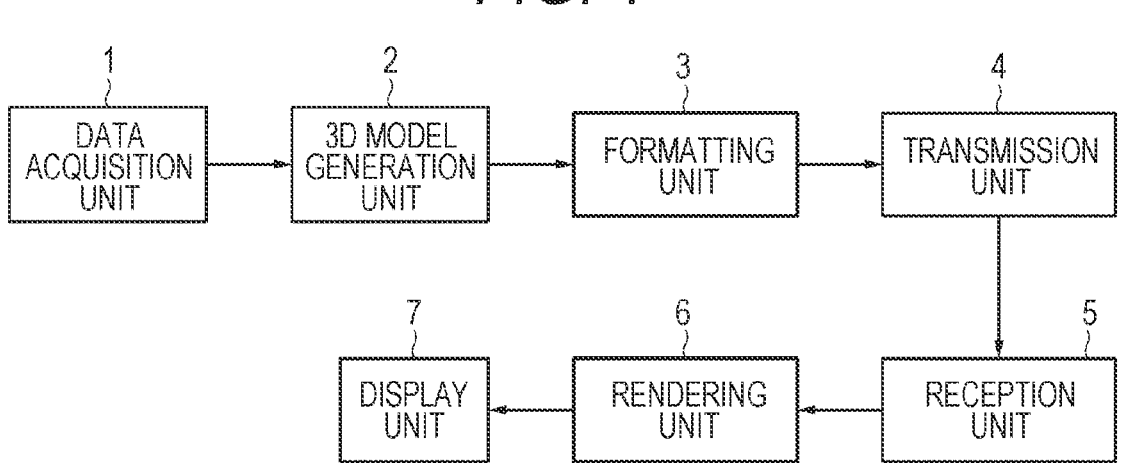
FIG. 1 is a diagram to be referred to in explanation of a technology related to the present disclosure.
Figure 2:
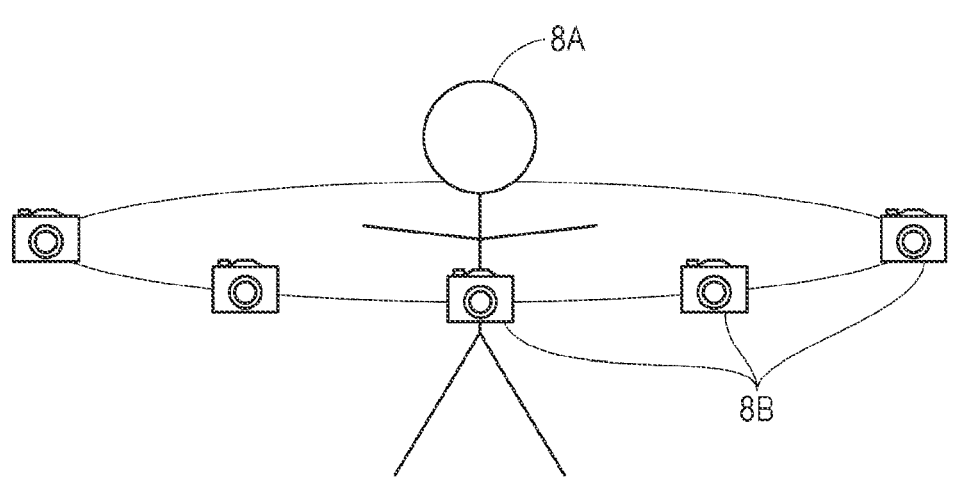
FIG. 2 is a diagram to be referred to in explanation of the technology related to the present disclosure.

First, in order to facilitate understanding of the present
disclosure, a technology related to the present disclosure
will be described. The technology related to the present
disclosure described below can be applied to the present
disclosure.
[Outline of Information Processing System]
FIG. 1 illustrates an outline of an information processing
system to which the present technology is applied. A data
acquisition unit 1 acquires image data for generating a 3D
model of a subject. For example, as illustrated in FIG. 2, a
plurality of viewpoint images captured by a plurality of
imaging devices 8B arranged to surround a subject 8A is
acquired as image data. In this case, the plurality of viewpoint images is preferably images captured by a plurality of
cameras in synchronization. Furthermore, the data acquisi-
tion unit 1 may acquire, for example, a plurality of viewpoint
images obtained by imaging the subject 8A from a plurality
of viewpoints by one camera as image data. Furthermore,
the data acquisition unit 1 may acquire, for example, one
captured image of the subject 8A as image data. In this case,
a 3D model generation unit 2 that will be described later
generates a 3D model using, for example, machine learning.
Note that the data acquisition unit 1 may perform calibration on the basis of the image data and acquire the
internal parameters and the external parameters of each
imaging device 8B. Furthermore, the data acquisition unit 1
may acquire, for example, a plurality of pieces of depth
information indicating distances from viewpoints at a plu-
rality of locations to the subject 8A.
The 3D model generation unit 2 generates a model having
three-dimensional information of the subject 8A on the basis
of image data for generating a 3D model of the subject 8A.
The 3D model generation unit 2 generates the 3D model of
the subject 8A by, for example, scraping the three-dimen-
sional shape of the subject 8A using images from a plurality
of viewpoints (for example, silhouette images from a plu-
rality of viewpoints) using a so-called visual hull. In this
case, the 3D model generation unit 2 can further deform the
3D model generated using the visual hull with high accuracy
using a plurality of pieces of depth information indicating
distances from viewpoints at a plurality of locations to the
subject 8A. Furthermore, for example, the 3D model generation unit 2 may generate the 3D model of the subject 8A
from one captured image of the subject 8A. The 3D model
generated by the 3D model generation unit 2 can also be
referred to as a moving image of the 3D model when the 3D
model is generated in units of time-series frames. Furthermore, since the 3D model is generated using an image
captured by the imaging device 8B, the 3D model can also
be referred to as a live-action 3D model. The 3D model can
express shape information indicating the surface shape of
the subject 8A in the form of mesh data expressed by a
connection between vertices called a polygon mesh, for
example. The method of expressing the 3D model is not limited thereto, and the 3D model may be described by a
so-called point cloud expression method expressed by point
position information.
Color information data is also generated as a texture in
association with the 3D shape data. For example, there are
a case of a view independent texture in which a color is
constant when viewed from any direction and a case of a
view dependent texture in which a color changes depending
on a viewing direction.
A formatting unit 3 (encoding unit) converts the data of
the 3D model generated by the 3D model generation unit 2
into a format suitable for transmission and accumulation.
For example, the 3D model generated by the 3D model
generation unit 2 may be converted into a plurality of
two-dimensional images by performing perspective projec-
tion from a plurality of directions. In this case, depth
information that is two-dimensional depth images from a
plurality of viewpoints may be generated using the 3D
model. The depth information and the color information of
the state of the two-dimensional image are compressed and
output to a transmission unit 4. The depth information and
the color information may be transmitted side by side as one
image or may be transmitted as two separate images. In this
case, since it is in the form of two-dimensional image data,
it can be compressed using a two-dimensional compression
technology such as advanced video coding (AVC).
Furthermore, for example, the 3D data may be converted
into a point cloud format. The three-dimensional data may
be output to the transmission unit 4. In this case, for
example, a three-dimensional compression technology of a
geometry-based approach discussed in MPEG can be used.
The transmission unit 4 transmits the transmission data
formed by the formatting unit 3 to a reception unit 5. The
transmission unit 4 performs a series of processing of the
data acquisition unit 1, the 3D model generation unit 2, and
the formatting unit 3 offline, and then transmits the trans-
mission data to the reception unit 5. In addition, the trans-
mission unit 4 may transmit the transmission data generated
from the series of processing described above to the recep-
tion unit 5 in real time.
The reception unit 5 receives the transmission data trans-
mitted from the transmission unit 4.
A rendering unit 6 performs rendering using the trans-
mission data received by the reception unit 5. For example,
texture mapping is performed in which a mesh of a 3D
model is projected from a viewpoint of a camera that draws
the mesh, and a texture representing a color or a pattern is
pasted. The drawing at this time can be set in any manner
and viewed from a free viewpoint regardless of the camera
position at the time of capturing an image.
For example, the rendering unit 6 performs texture map-
ping of pasting a texture representing the color, pattern, or
texture of the mesh according to the position of the mesh of
the 3D model. Regarding the texture mapping, there are a
so-called view dependent method in which the viewing
viewpoint of the user is considered and a so-called view
independent method in which the viewing viewpoint of the
user is not considered. Since the view dependent method
changes the texture to be pasted on the 3D model according
to the position of the viewing viewpoint, there is an advan-
tage that high quality rendering can be realized as compared
with the view independent method. On the other hand, since
the view independent method does not consider the position
of the viewing viewpoint, there is an advantage that the
processing amount is reduced as compared with the view
dependent method. Note that the viewing viewpoint data is
input from the display device to the rendering unit 6 after the display device detects a viewing location (region of interest) of the user. Furthermore, the rendering unit 6 may adopt, for example, billboard rendering for rendering an object so that the object maintains a vertical posture with respect to the viewing viewpoint. For example, when rendering a plurality of objects, objects of low interest to the viewer may be rendered in a billboard, and other objects may be rendered with other rendering methods.

The display unit 7 displays the result rendered by the rendering unit 6 on the display unit 7 of the display device. The display device may be a 2D monitor or a 3D monitor, for example, a head-mounted display, a spatial display, a mobile phone, a television, a PC, or the like.

The information processing system in FIG. 1 illustrates a series of flow from the data acquisition unit 1 that acquires a captured image that is a material for generating content to the display control unit that controls the display device viewed by the user. However, this does not mean that all functional blocks are necessary for implementation of the present technology, and the present technology can be implemented for each functional block or a combination of a plurality of functional blocks. For example, in FIG. 1, the transmission unit 4 and the reception unit 5 are provided in order to illustrate a series of flow from a content creating side to a content viewing side through distribution of content data, but in a case where content creation to viewing are performed by the same information processing apparatus (for example, a personal computer), it is not necessary to include the encoding unit, the transmission unit 4, the decoding unit, or the reception unit 5.

When the present information processing system is implemented, the same implementer may implement all the processes, or different implementers may implement each functional block. As an example, a company A generates 3D content through the data acquisition unit 1, the 3D model generation unit 2, and the formatting unit 3. Then, it is conceivable that the 3D content is distributed through the transmission unit 4 (platform) of a company B, and the display device of a company C performs reception, rendering, and display control of the 3D content.

In addition, each functional block can be implemented on a cloud. For example, the rendering unit 6 may be implemented in a display device or may be implemented by a server. In this case, information is exchanged between the display device and the server.

In FIG. 1, the data acquisition unit 1, the 3D model generation unit 2, the formatting unit 3, the transmission unit 4, the reception unit 5, the rendering unit 6, and the display unit 7 are collectively described as an information processing system. However, the information processing system of the present specification is referred to as an information processing system when two or more functional blocks are involved, and for example, the data acquisition unit 1, the 3D model generation unit 2, the encoding unit, the transmission unit 4, the reception unit 5, the decoding unit, and the rendering unit 6 can be collectively referred to as an information processing system without including the display unit 7.

[Processing Flow of Information Processing System]

Figure 3:
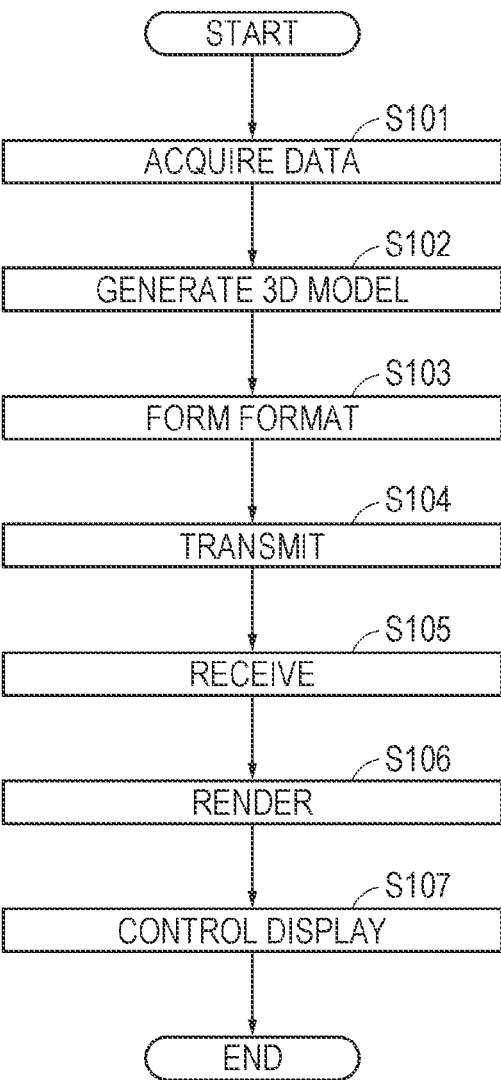
FIG. 3 is a diagram to be referred to in explanation of the technology related to the present disclosure.

An example of a processing flow of the information processing system will be described with reference to a flowchart of FIG. 3.

When the processing is started, in step S101, the data acquisition unit 1 acquires image data for generating a 3D model of the subject 8A. In step S102, the 3D model generation unit 2 generates a model having three-dimensional information of the subject 8A on the basis of image data for generating a 3D model of the subject 8A. In step S103, the formatting unit 3 encodes the shape and texture data of the 3D model generated by the 3D model generation unit 2 into a format suitable for transmission and accumulation. In step S104, the transmission unit 4 transmits the encoded data, and in step S105, the reception unit 5 receives the transmitted data. In step S106, the decoding unit performs decoding processing to convert the data into shape and texture data necessary for display, and the rendering unit 6 performs rendering using the shape and texture data. In step S107, the display unit 7 displays the rendering result. When the processing of step S107 ends, the processing of the information processing system ends.

Figure 4:
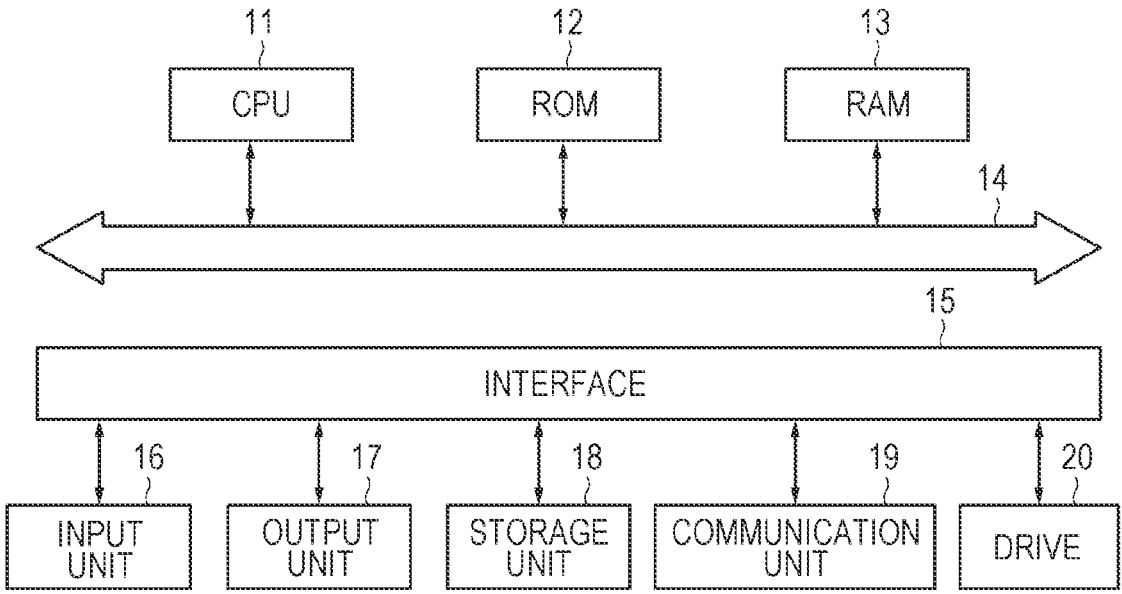
FIG. 4 is a diagram to be referred to in explanation of the technology related to the present disclosure.

FIG. 4 is a block diagram illustrating a configuration example of hardware of a computer that executes the above-described series of processing by a program. In the computer illustrated in FIG. 4, a central processing unit (CPU) 11, a read only memory (ROM) 12, and a random access memory (RAM) 13 are mutually connected via a bus 14. An input/output interface 15 is also connected to the bus 14. An input unit 16, an output unit 17, a storage unit 18, a communication unit 19, and a drive 20 are connected to the input/output interface 15. The input unit 16 includes, for example, a keyboard, a mouse, a microphone, a touch panel, an input terminal, and the like. The output unit 17 includes, for example, a display, a speaker, an output terminal, and the like. The storage unit 18 includes, for example, a hard disk, a RAM disk, a nonvolatile memory, and the like. The communication unit 19 includes, for example, a network interface. The drive 20 drives a removable medium such as a magnetic disk, an optical disc, a magneto-optical disc, or a semiconductor memory.

In the computer configured as described above, for example, the CPU 11 loads a program stored in the storage unit into the RAM 13 via the input/output interface 15 and the bus 14 and executes the program, whereby the above-described series of processing is performed. The RAM 13 also appropriately stores data and the like necessary for the CPU 11 to execute various types of processing.

The program executed by the computer can be applied, for example, by being recorded in a removable medium as a package medium or the like. In this case, the program can be installed in the storage unit 18 via the input/output interface 15 by attaching the removable medium to the drive 20. Furthermore, this program can also be provided via a wired or wireless transmission medium such as a local area network, the Internet, or digital satellite broadcasting. In this case, the program can be received by the communication unit 19 and installed in the storage unit 18.

Embodiment

[Configuration Example of Information Processing Apparatus]

Figure 5:
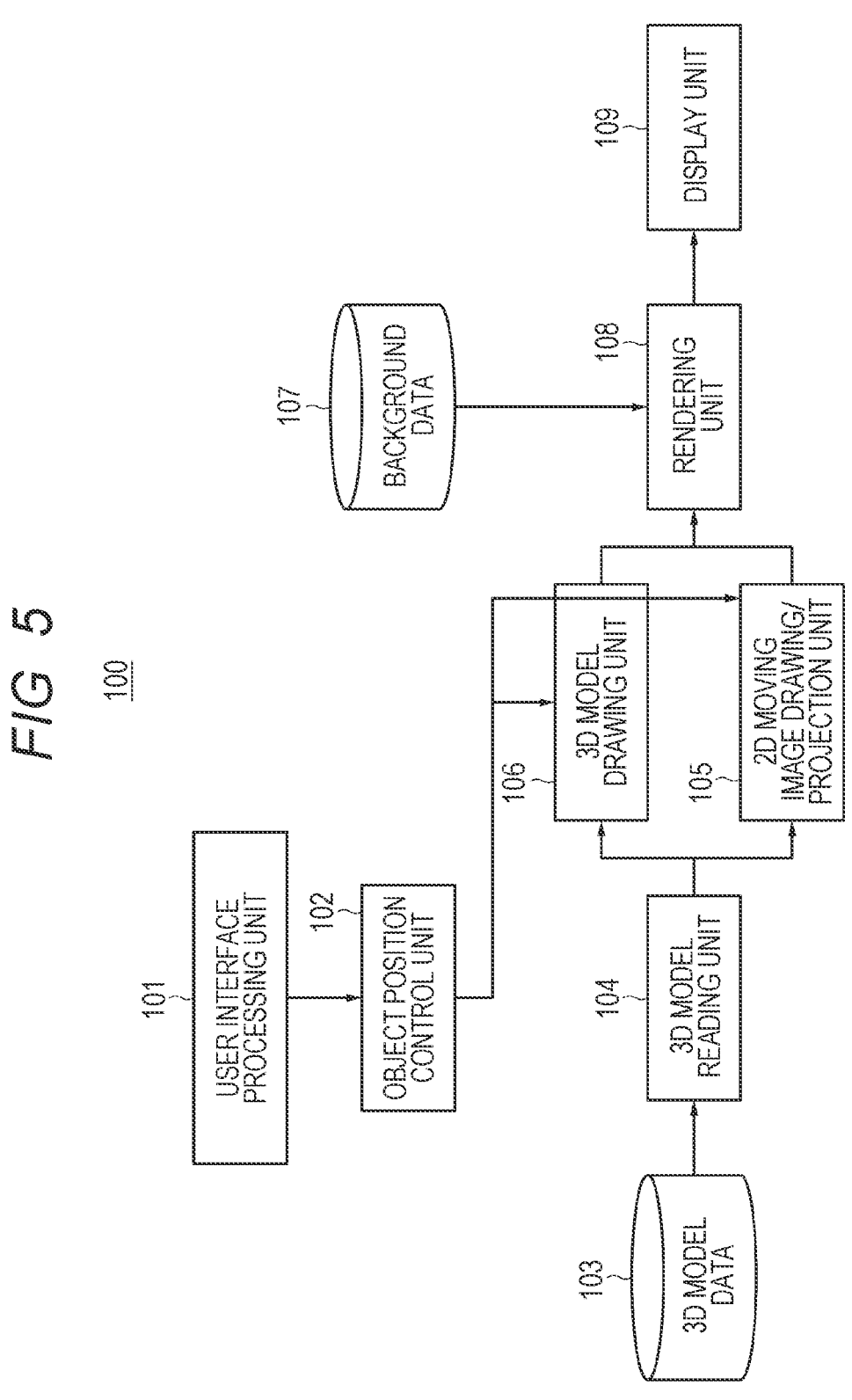
FIG. 5 is a diagram for explaining a configuration example of an information processing apparatus according to an embodiment.

FIG. 5 is a diagram for explaining a configuration example of the information processing apparatus (information processing apparatus 100) according to the first embodiment. The information processing apparatus 100 can be configured as, for example, a head-mounted display used by being worn on the head of the user. The information processing apparatus 100 may be configured as a display of another form such as a spectacle type.

The information processing apparatus 100 includes a user interface processing unit 101, an object position control unit 102, a first storage unit 103, a 3D model reading unit 104, a 2D moving image drawing/projection unit 105, a 3D model drawing unit 106, a second storage unit 107, a rendering unit 108, and a display unit 109.

The user interface processing unit 101 processes an operation input to an operation input unit (not illustrated) such as a controller. For example, when head tracking or a predetermined operation on the controller is performed, the user interface processing unit 101 detects the operation and generates an operation input signal corresponding to the operation. Then, the user interface processing unit 101 supplies the generated operation input signal to, for example, the object position control unit 102.

The object position control unit 102 controls the position of an object in a predetermined virtual space on the basis of an operation input signal from the user interface processing unit 101. Specifically, on the basis of the operation input signal, the object position control unit 102 performs control to bring the position of the object in the virtual space closer to or away from the user position in the virtual space.

The first storage unit 103 stores 3D model data of a predetermined object. As the first storage unit 103, a magnetic storage device such as a hard disk drive (HDD), a semiconductor storage device, an optical storage device, a magneto-optical storage device, or the like can be applied.

The 3D model reading unit 104 reads the 3D model data from the first storage unit 103.

The 2D moving image drawing/projection unit 105, which is an example of a first image processing unit, projects a predetermined object on a two-dimensional plane in a virtual space. The 2D moving image drawing/projection unit 105 projects a three-dimensional model of an object on a two-dimensional plane, for example. Note that the two-dimensional plane is, for example, a display arranged in a virtual space. By the processing by the 2D moving image drawing/projection unit 105, a predetermined object is displayed in 2D on a two-dimensional plane. The display state corresponding to the processing of the 2D moving image drawing/projection unit 105 is the first rendering state.

The 3D model drawing unit 106, which is an example of a second image processing unit, renders a three-dimensional model related to a predetermined object at a location that is not a two-dimensional plane in a virtual space.

Note that the 2D moving image drawing/projection unit 105 and the 3D model drawing unit 106 operate based on the position information of the object supplied from the object position control unit 102. Although details will be described later, depending on the position of the object, the 2D moving image drawing/projection unit 105 and the 3D model drawing unit 106 may operate, or only one of them may operate. Furthermore, the 2D moving image drawing/projection unit 105 can project an object having a size corresponding to the position information of the object supplied from the object position control unit 102 on a two-dimensional plane. Similarly, the 3D model drawing unit 106 can also render an object (three-dimensional model) having a size corresponding to the position information of the object supplied from the object position control unit 102.

The second storage unit 107 stores background data. As the second storage unit 107, a magnetic storage device such as an HDD, a semiconductor storage device, an optical storage device, a magneto-optical storage device, or the like can be applied.

The rendering unit 108 draws the background on the basis of the background data with respect to the foreground drawn by the 2D moving image drawing/projection unit 105 or the 3D model drawing unit 106. The background data may be any data such as a three-dimensional model, an omnidirectional picture, or an omnidirectional video in the virtual space.

The display unit 109 is a display that displays a processing result by the rendering unit 108.

[Operation Example of Information Processing apparatus]

(Outline of Operation)

Figure 6:
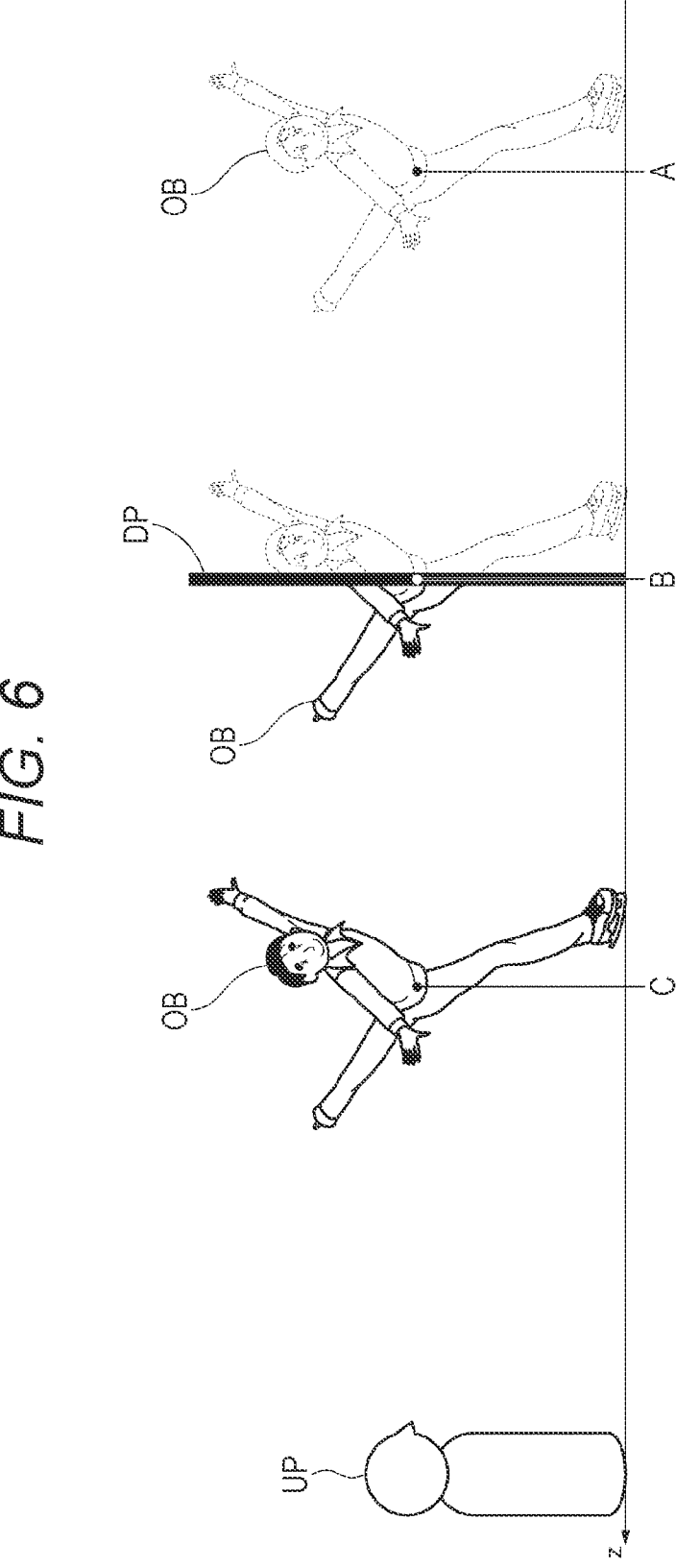
FIG. 6 is a diagram that is referred to in explanation of an operation example of the information processing apparatus according to the embodiment.

Next, an operation example of the information processing apparatus 100 will be described. In the present embodiment, the first rendering state and the second rendering state are switched according to the position of the object in the virtual space and the position of the two-dimensional plane. As illustrated in FIG. 6, the user position in the virtual space is referred to as a user position UP. A position of a two-dimensional plane (hereinafter, such a two-dimensional plane will be described as a display) in the virtual space is referred to as a position DP. The position of the object OB changes with respect to the user position UP. In the illustrated example, the object OB is a male who skates, but may be an appropriate object who dances, runs, or the like. In the present embodiment, the position of the object OB changes according to the operation input of the user. It is needless to say that the position of the object OB may change as appropriate as the video progresses. As illustrated in FIG. 6, the depth direction (z axis) is defined with respect to the user position UP. The size of the z coordinate on the z axis becomes larger as it becomes closer to the user position UP.

In a case where the object OB is at a point A illustrated in FIG. 6, that is, on the far side from the position DP of the display, the object OB is displayed in the first rendering state. That is, the object OB is displayed in 2D on the display. Then, for example, the position of the object OB changes from the point A to a point B and then to a point C according to the user operation. In a case where the position of the object OB becomes larger than the position DP of the display which is the boundary surface, that is, in a case where the object OB approaches the user position UP, the object OB is displayed in the second rendering state. That is, the object OB is rendered with the three-dimensional model. Furthermore, in a case where a part of the object OB straddles the position DP of the display as in the position B in FIG. 6, the part of the object OB is displayed in the second rendering state, and the remaining part of the object OB is displayed in the first rendering state. In this manner, by performing the control of seamlessly switching the rendering state according to the change in the position of the object OB, it is possible to realize video expression as if the three-dimensional model pops out from the video projected on the display.

Figure 7:
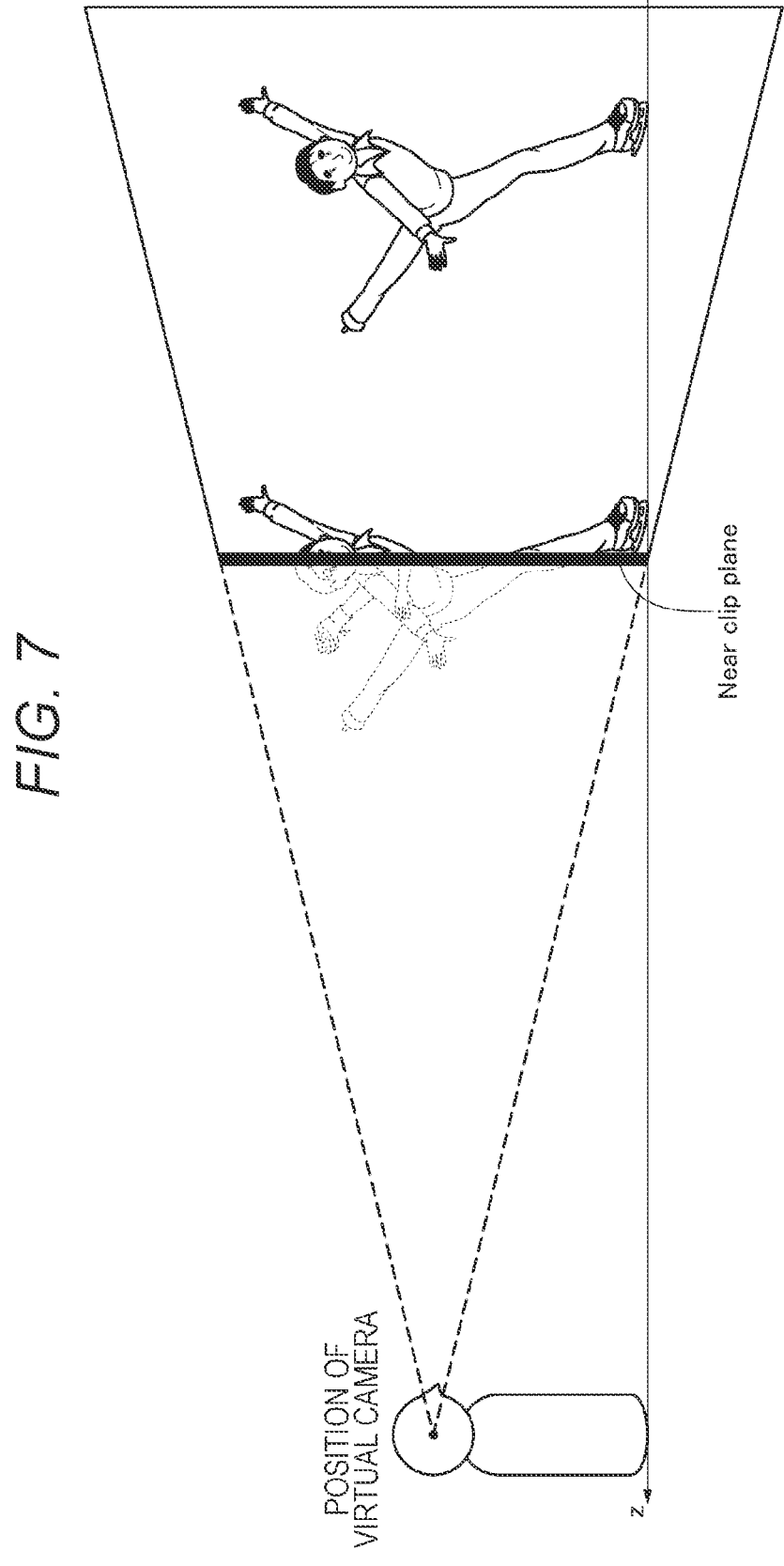
FIG. 7 is a diagram that is referred to in explanation of an operation example of the information processing apparatus according to the embodiment.

FIG. 7 is a diagram illustrating arrangement of a virtual camera and a frustum used when a three-dimensional model is projected on a display in the first rendering state. The arrangement position of the virtual camera is preferably the center of gravity of the display to be projected, and the direction is preferably perpendicular to the display to be projected. Furthermore, the near clip plane of the frustum of the virtual camera is set to coordinates equal to the coordinates of the position DP of the display.

Figure 8:
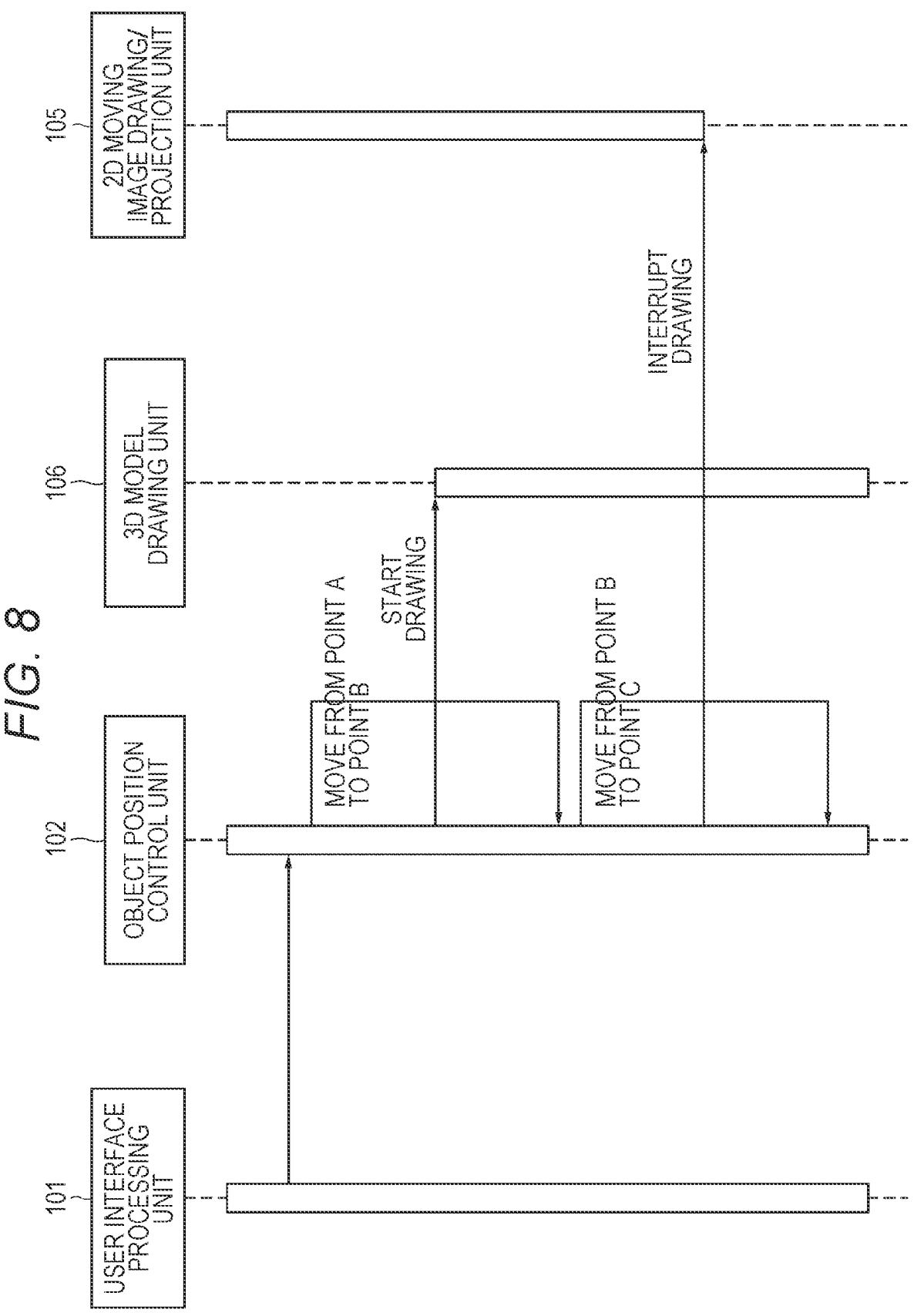
FIG. 8 is a diagram that is referred to in explanation of an operation example of the information processing apparatus according to the embodiment.
Figure 9:
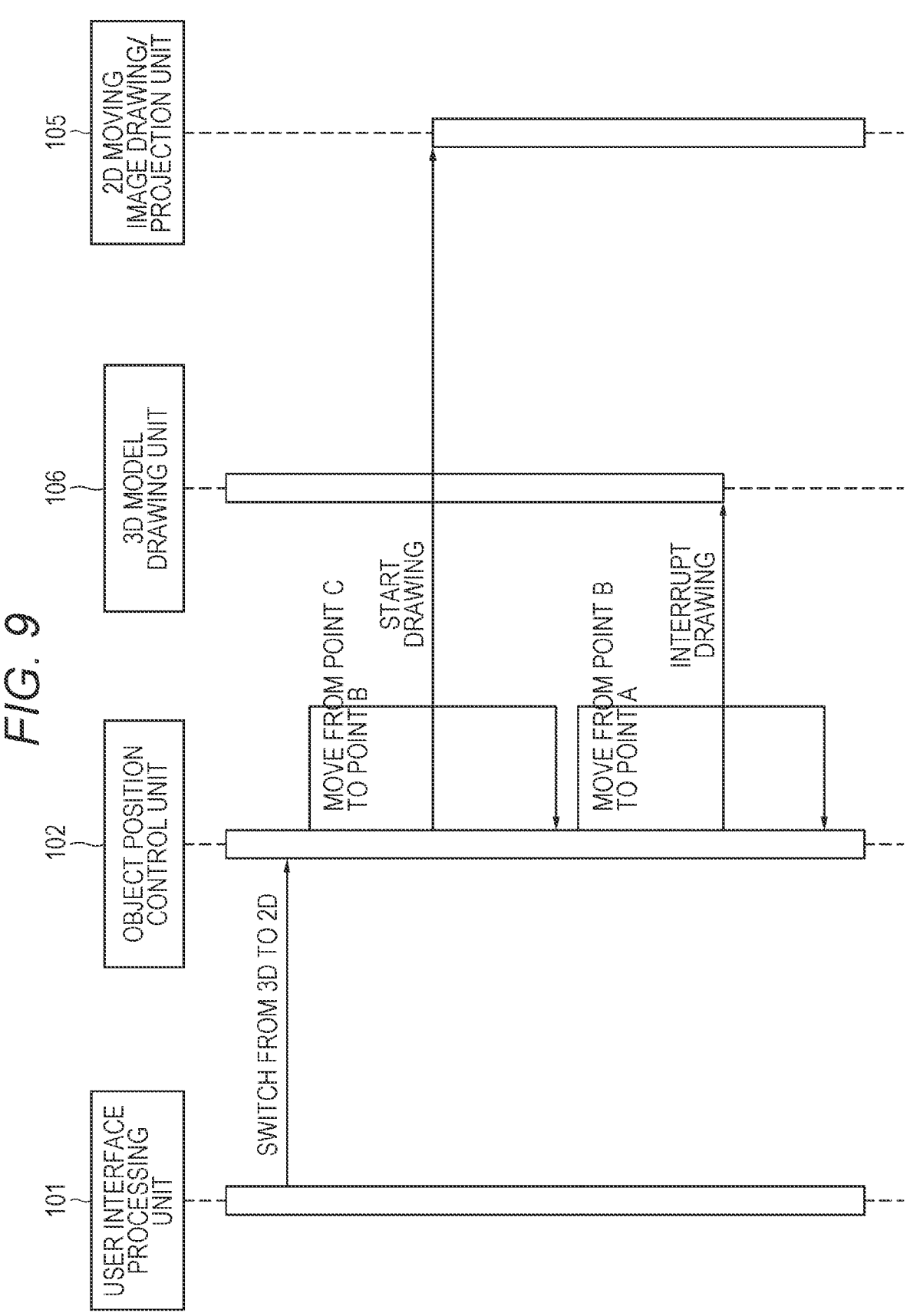
FIG. 9 is a diagram that is referred to in explanation of an operation example of the information processing apparatus according to the embodiment.

An operation example of the information processing apparatus 100 will be specifically described with reference to the sequence diagrams illustrated in FIGS. 8 and 9. FIG. 8 illustrates an example in which the position of the object OB changes from the point A to the point B and then to the point C, and on the contrary, FIG. 9 illustrates an example in which the position of the object OB changes from point C to the point B and then to the point A.

The user performs an operation input to bring the position of the object OB closer. An operation input signal corresponding to such an operation input is generated by the user interface processing unit 101, and the generated operation input signal is supplied to the object position control unit 102. The object position control unit 102 moves the position of the object displayed on the display unit 109 in a direction of approaching the user, and monitors whether or not the position of the object OB exceeds the position DP of the display. In the present example, since the initial position of the object OB is the point A and the initial position of the object OB is smaller than the position DP of the display, the 2D moving image drawing/projection unit 105 performs processing to display the object OB in the first rendering state.

The object position control unit 102 moves the position of the object OB according to the operation input signal. Then, in a case where a part of the object OB reaches the point B and exceeds the position DP of the display, the object position control unit 102 notifies the 3D model drawing unit 106 of this fact. The 3D model drawing unit 106 renders a part beyond the position DP of the display with the 3D model. As a result, the part beyond the position DP of the display in the object OB is rendered with the 3D model.

Further, the object OB moves from the point B to the point C. In a case where the coordinates (coordinates in the depth direction) of the point B, that is, all the positions of the object OB become larger than the coordinates of the position DP of the display, the object position control unit 102 notifies the 2D moving image drawing/projection unit 105 of this fact. As a result, the processing by the 2D moving image drawing/projection unit 105 is interrupted, and only the processing by the 3D model drawing unit 106 is performed. Therefore, all the objects OB are rendered with the 3D model.

Conversely, the user performs an operation input to move the position of the object OB away. An operation input signal corresponding to such an operation input is generated by the user interface processing unit 101, and the generated operation input signal is supplied to the object position control unit 102. The object position control unit 102 moves the position of the object displayed on the display unit 109 in a direction away from the user, and monitors whether or not the position of the object OB exceeds the position DP of the display. In the present example, since the initial position of the object OB is the point C and the coordinates (coordinates in the depth direction) of the initial position of the object OB are larger than the coordinates of the position DP of the display, the 3D model drawing unit 106 performs processing to display the object OB in the second rendering state.

The object position control unit 102 moves the position of the object OB according to the operation input signal. Then, in a case where a part of the object OB reaches the point B and exceeds the position DP of the display, the object position control unit 102 notifies the 2D moving image drawing/projection unit 105 of this fact. The 2D moving image drawing/projection unit 105 projects the part beyond the position DP of the display on the display. As a result, a part of the object OB is displayed in the first rendering state.

Further, the object OB moves from the point B to the point A. In a case where the coordinates of the point A, that is, the coordinates of all the positions of the object OB become smaller than the coordinates of the position DP of the display, the object position control unit 102 notifies the 3D model drawing unit 106 of this fact. As a result, the processing by the 3D model drawing unit 106 is interrupted, and only the processing by the 2D moving image drawing/projection unit 105 is performed. Therefore, all the objects OB are projected on the display and displayed as 2D models.

FIG. 10 is a flowchart illustrating a processing flow performed by the information processing apparatus 100 according to an embodiment. In step S11, the 3D model data on the predetermined object is read by the 3D model reading unit 104. Then, processing of selecting a polygon to be drawn in the three-dimensional model corresponding to the 3D model data is performed. Then, the processing proceeds to step S12.

In step S12, processing of selecting a pixel in the polygon selected in step S11 (processing called rasterization) is performed. Then, the processing proceeds to step S13.

In step S13, the position information of the pixel selected in step S12, specifically, the z coordinate in the z-axis direction, which is the depth information, is acquired. Then, the processing proceeds to step S14.

In step S14, it is determined whether or not the z coordinate of the pixel is larger than the z coordinate of the boundary portion, that is, the two-dimensional plane arranged in the virtual space. In a case where the determination result is No, the processing proceeds to step S15.

In step S15, the 2D moving image drawing/projection unit 105 projects the pixel to be determined in step S14 onto a two-dimensional plane (first rendering state). Then, the processing proceeds to step S17.

In a case where the determination result of step S14 is Yes, the processing proceeds to step S16. In step S16, the 3D model drawing unit 106 renders the pixel to be determined in step S14 as a 3D model (second rendering state). Then, the processing proceeds to step S17.

In step S17, it is determined whether or not all the pixels in the polygon have been drawn. When not all the pixels are drawn, the processing returns to step S13. In a case where all the pixels have been drawn, the processing ends.

Among the above-described processing, processing related to the position (steps S11 to S14 and S17) is performed by the object position control unit 102, processing in step S15 is performed by the 2D moving image drawing/projection unit 105, and processing in step S16 is performed by the 3D model drawing unit 106. It is needless to say that this is an example, and an appropriate functional block included in the information processing apparatus 100 can perform the above-described processing.

In this manner, in the present embodiment, whether to perform display in one of the first rendering state and the second rendering state is determined in units of pixels of polygons constituting the three-dimensional model.

[Specific Display Example]

Next, a specific example of the video displayed on the display unit 109 will be described.

The video projected on the two-dimensional plane by the 2D moving image drawing/projection unit 105 may be a video obtained by rendering a three-dimensional model with a single virtual camera or a video obtained by rendering a three-dimensional model with left and right virtual cameras arranged on the basis of the interocular distance. According to the latter, it is possible to maintain a stereoscopic effect at the time of projecting a video on a two-dimensional plane. Furthermore, it is possible to reduce the sense of discomfort caused by the change in stereoscopic effect that occurs at the time of switching from the first rendering state to the second rendering state.

The video projected on the two-dimensional plane by the 2D moving image drawing/projection unit 105 may be a video stored in advance or a video obtained by actual imaging. For example, in the first rendering state, a live-action video captured by the actual camera is displayed. In the second rendering state, the volumetric video is displayed. At this time, the video used in the first rendering state is selected to be close to the viewpoint from which the user views the 3D model of the volumetric video in the second rendering state. Volumetric video means video using a three-dimensional model obtained by imaging a subject with cameras of a plurality of viewpoints and three-dimensionally reconstructing the subject by using the imaging information and the imaging result.

Figure 11:
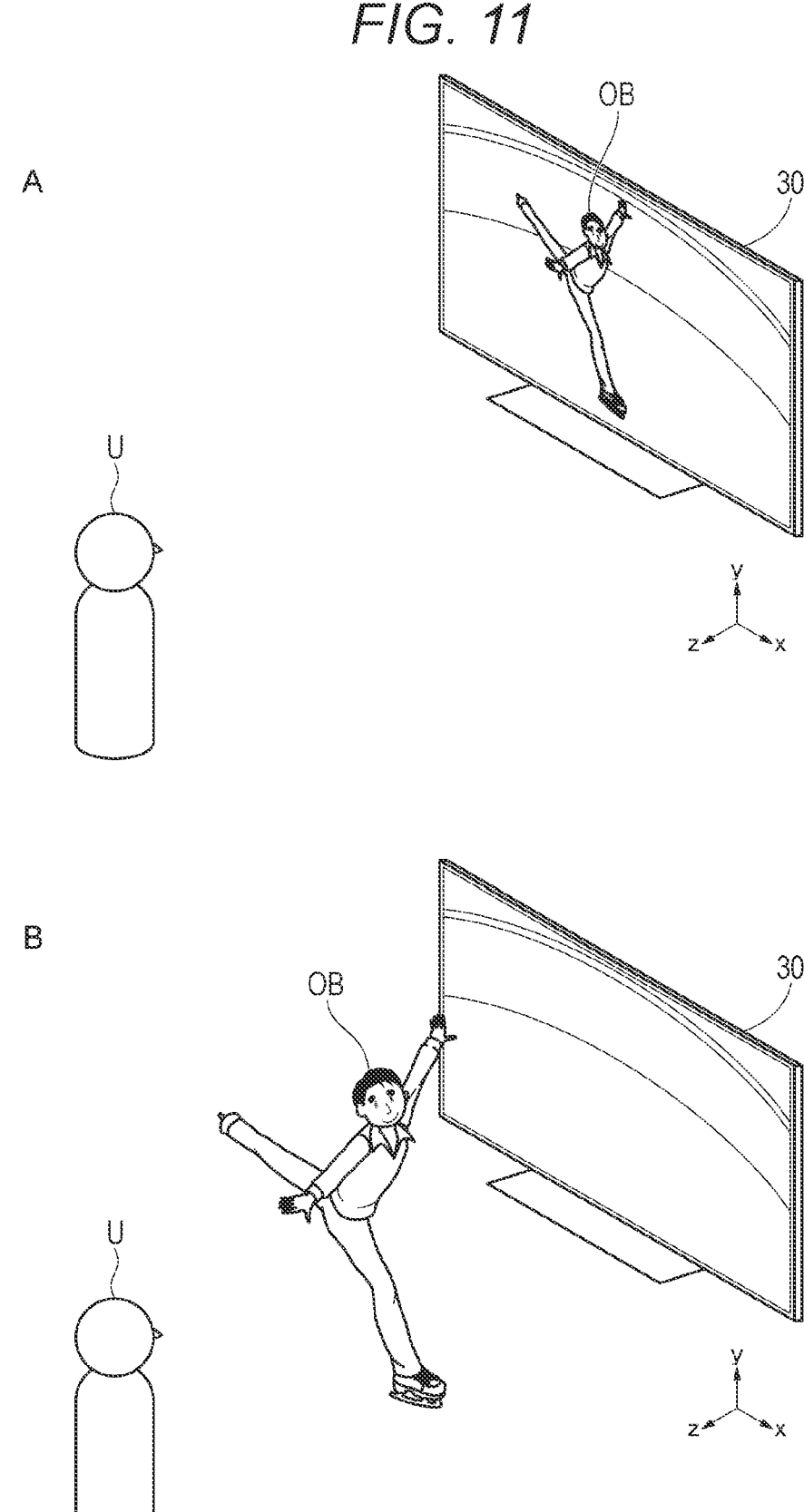
FIGS. 11A and 11B are diagrams for explaining a specific example of a video displayed on a display unit according to the embodiment.

Furthermore, an example of switching from the first rendering state illustrated in FIG. 11A to the second rendering state illustrated in FIG. 11B will be considered. As illustrated in FIG. 11A, the object OB is projected and displayed on the display 30 arranged in the virtual space in the first rendering state. A video on which the background (for example, skate link) is superimposed together with the object OB is displayed on the display 30. The background superimposition processing is performed by the rendering unit 108, for example, but may be performed by the 2D moving image drawing/projection unit 105. Furthermore, in the second rendering state illustrated in FIG. 11B, the background may be continuously displayed on the display 30.

Figure 12:
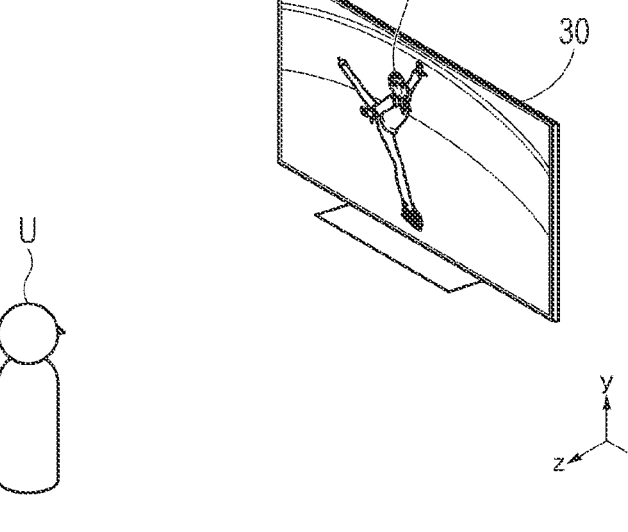
FIGS. 12A to 12C are diagrams for explaining a specific example of a video displayed on the display unit according to the embodiment.
Figure 12:
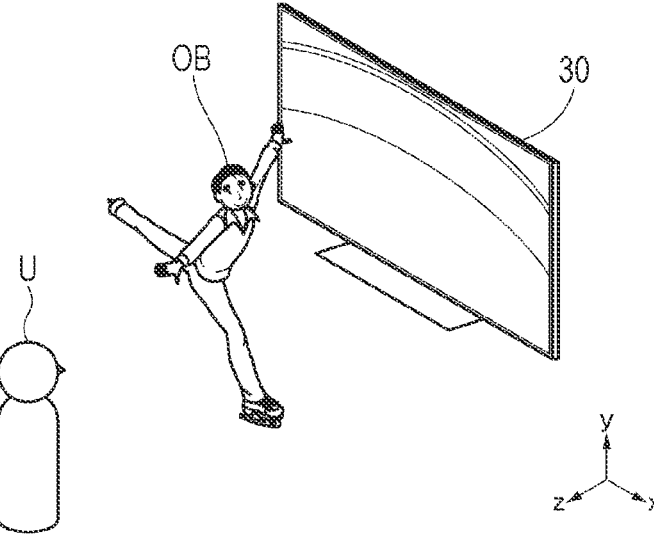
Figure 12:
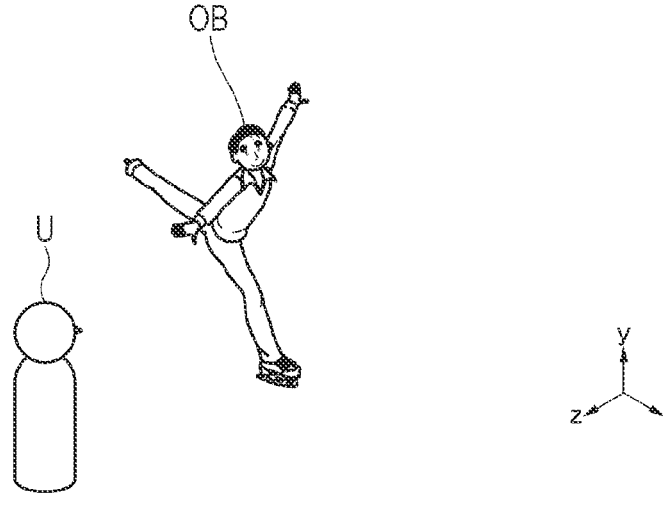

Furthermore, an example of switching from the first rendering state illustrated in FIG. 12A to the second rendering state illustrated in FIG. 12B will be considered. In this case, after the rendering state is switched to the second rendering state, drawing on the display 30 may be interrupted and the display 30 may be erased as illustrated in FIG. 12C.

Figure 13:
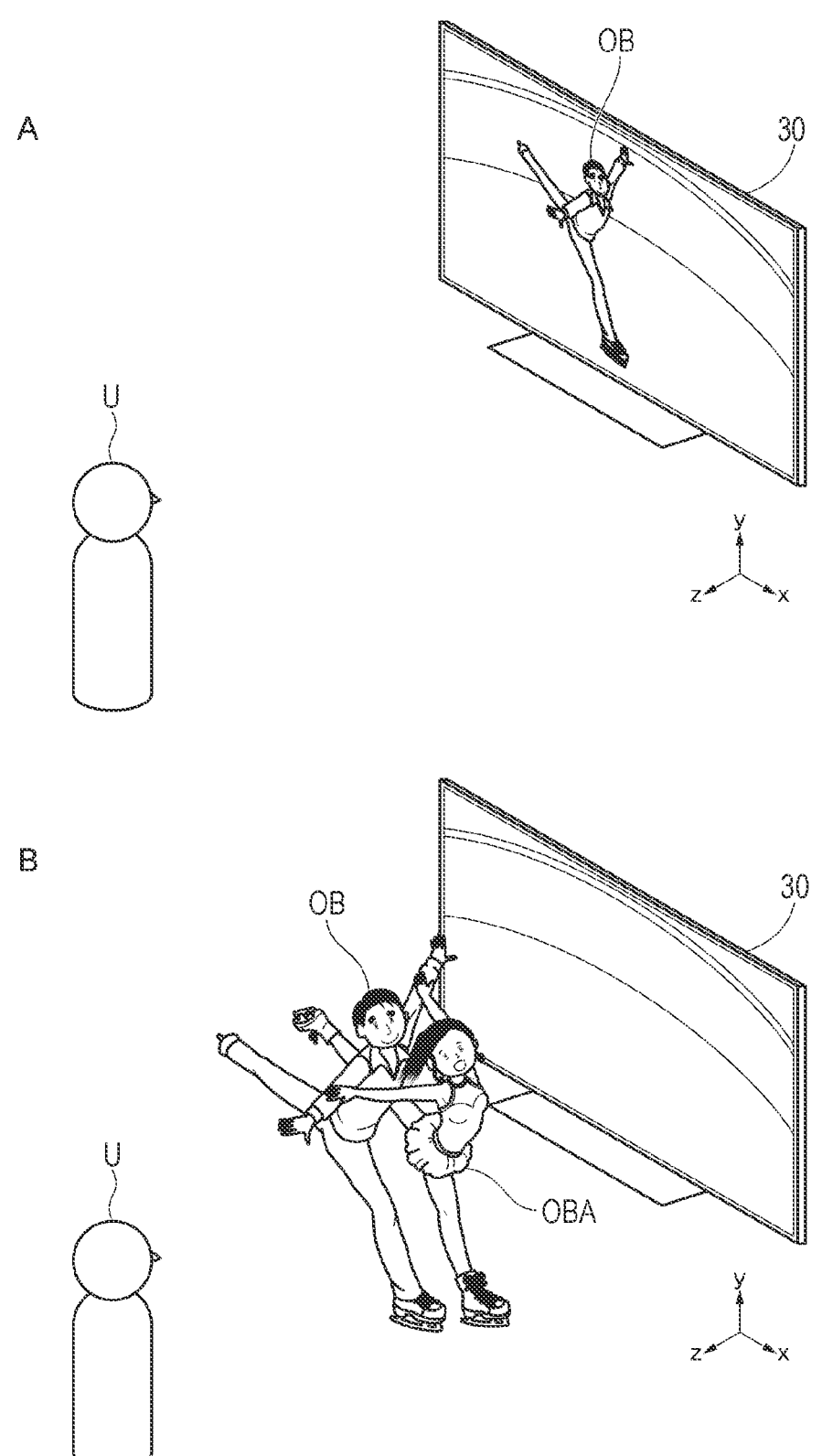
FIGS. 13A and 13B are diagrams for explaining a specific example of a video displayed on the display unit according to the embodiment.

Furthermore, an example of switching from the first rendering state illustrated in FIG. 13A to the second rendering state illustrated in FIG. 13B will be considered. In this case, in the second rendering state illustrated in FIG. 13B, an object (an object OBA in FIG. 13B) different from the object OB that has not been projected on the display 30 in the first rendering state may be rendered as a three-dimensional model. Such processing is performed by the 3D model drawing unit 106, for example.

Modification Example

Although an embodiment of the present disclosure has been specifically described above, the content of the present disclosure is not limited to the above-described embodiment, and various modifications on the basis of the technical idea of the present disclosure are possible.

In the above-described embodiment, the object to be displayed may be a general three-dimensional model, or may be a three-dimensional model obtained by imaging a subject with cameras of a plurality of viewpoints and three-dimensionally reconstructing the object using the imaging information and the imaging result. Furthermore, in the first rendering state, the shape of the two-dimensional plane to be the projection destination may be a rectangle as described in one embodiment, or may be any shape such as a polygon or a circle. Furthermore, as the two-dimensional plane, a device that actually displays a two-dimensional video such as a television or a projector screen may be used. Furthermore, three or more rendering states may be switchable.

Some of the configurations and functions of the information processing apparatus according to the above-described embodiments may exist in a device (for example, a server device or the like on a network) different from the information processing apparatus. For example, the first storage unit 103 or the second storage unit 107 may be a server device connectable to the information processing apparatus via a network.

Furthermore, for example, the program for realizing the above-described functions may be executed in any device. In that case, it is only required that the device has necessary functional blocks and can obtain necessary information. Furthermore, for example, each step of one flowchart may be executed by one device, or may be shared and executed by a plurality of devices. Furthermore, in a case where a plurality of pieces of processing is included in one step, the plurality of pieces of processing may be executed by one device, or may be shared and executed by a plurality of devices. In other words, a plurality of processes included in one step can also be executed as processing of a plurality of steps. Conversely, the processing described as a plurality of steps can be collectively executed as one step.

Furthermore, for example, in the program executed by the computer, processing of steps describing the program may be executed in time series in the order described in the present specification, or may be executed in parallel or individually at necessary timing such as when a call is made. That is, as long as there is no contradiction, the processing of each step may be executed in an order different from the above-described order. Furthermore, the processing of steps describing this program may be executed in parallel with the processing of another program, or may be executed in combination with the processing of another program. Furthermore, for example, a plurality of technologies related to the present technology can be implemented independently as a single body as long as there is no contradiction. It is needless to say that any of the plurality of present technologies can be implemented in combination. For example, some or all of the present technologies described in any embodiment can be implemented in combination with some or all of the present technologies described in other embodiments. Furthermore, some or all of any of the above-described present technologies can be implemented in combination with other technologies not described above.

Note that the contents of the present disclosure are not to be construed as being limited by the effects exemplified in the present specification.

The present disclosure can also adopt the following configurations.

(1)
An information processing apparatus including:
a first image processing unit that projects a predetermined object onto a two-dimensional plane in a virtual space; and
a second image processing unit that renders a three-dimensional model related to the predetermined object at a location that is not the two-dimensional plane in the virtual space,
in which at least a first rendering state by the first image processing unit and a second rendering state by the second image processing unit are switchable.
(2)
The information processing apparatus described in (1),
in which the first image processing unit projects a video obtained by rendering the three-dimensional model with a single virtual camera or a video obtained by rendering the three-dimensional model with left and right virtual cameras arranged on the basis of an interocular distance, onto the two-dimensional plane.

13

14

(3)

The information processing apparatus described in (1) or (2), in which the first image processing unit projects a video obtained by actual imaging onto the two-dimensional plane.

(4)

The information processing apparatus described in any of (1) to (3), in which the second image processing unit renders the object and an object different from the object at a location that is not the two-dimensional plane in the virtual space in the second rendering state.

(5)

The information processing apparatus described in (2) or (3), in which, in the first rendering state, a video on which a background is further superimposed is projected onto the two-dimensional plane.

(6)

The information processing apparatus described in any of (1) to (5), in which, in the second rendering state, a video of only a background is projected onto the two-dimensional plane.

(7)

The information processing apparatus described in any of (1) to (6), in which the two-dimensional plane is displayed in the first rendering state, and the two-dimensional plane is erased in the second rendering state.

(8)

The information processing apparatus described in any of (1) to (7), in which the first rendering state and the second rendering state are switched according to the position of the object in the virtual space and the position of the two-dimensional plane.

(9)

The information processing apparatus described in any of (1) to (8), in which a position of the object with respect to a user position in the virtual space changes according to a user operation.

(10)

The information processing apparatus described in any of (1) to (9), in which whether to perform display in one of the first rendering state and the second rendering state is determined in units of pixels of polygons constituting the three-dimensional model.

(11)

An information processing method, in which a first image processing unit projects a predetermined object onto a two-dimensional plane in a virtual space, a second image processing unit renders a three-dimensional model related to the predetermined object at a location that is not the two-dimensional plane in the virtual space, and at least a first rendering state by the first image processing unit and a second rendering state by the second image processing unit are switchable.

(12)

A program that causes a computer to execute an information processing method, in which a first image processing unit projects a predetermined object onto a two-dimensional plane in a virtual space, a second image processing unit renders a three-dimensional model related to the predetermined object at a location that is not the two-dimensional plane in the virtual space, and at least a first rendering state by the first image processing unit and a second rendering state by the second image processing unit are switchable.

Application Example

The technology according to the present disclosure can be applied to various products and services.

(Production of Content)

For example, a new video content may be produced by combining the 3D model of the subject generated in the above-described embodiment with 3D data managed by another server. Furthermore, for example, in a case where background data acquired by an imaging device such as LiDAR is present, content as if the subject is at a place indicated by the background data can be produced by combining the 3D model of the subject generated in the above-described embodiment and the background data. Note that the video content may be three-dimensional video content or two-dimensional video content converted into two dimensions. Note that examples of the 3D model of the subject generated in the above-described embodiment include a 3D model generated by the 3D model generation unit 2 and a 3D model reconstructed by the rendering unit 6.

(Experience in Virtual Space)

For example, the subject (for example, a performer) generated in the present embodiment can be arranged in a virtual space that is a place where the user communicates as an avatar. In this case, the user becomes an avatar and can view the subject of the live-action image in the virtual space.

(Application to Communication with Remote Location)

For example, by transmitting the 3D model of the subject generated by the 3D model generation unit 2 from the transmission unit 4 to a remote location, a user at the remote location can view the 3D model of the subject through a reproduction device at the remote location. For example, by transmitting the 3D model of the subject in real time, the subject and the user at the remote location can communicate with each other in real time. For example, a case where the subject is a teacher and the user is a student, or a case where the subject is a doctor and the user is a patient is assumed.

(Others)

For example, a free viewpoint video of a sport or the like can be generated on the basis of the 3D models of the plurality of subjects generated in the above-described embodiment, or an individual can distribute himself/herself, which is the 3D model generated in the above-described embodiment, to the distribution platform. As described above, the contents in the embodiments described in the present specification can be applied to various technologies and services.

REFERENCE SIGNS LIST

100 Information processing apparatus
105 2D moving image drawing/projection unit
106 3D model drawing unit 15                                                      16

The invention claimed is:

1. A head-mounted display comprising:

circuitry configured to
reproduce video content including a virtual object,
control a display to display the virtual object in a virtual
space onto a two-dimensional plane, and
control the display to display a three-dimensional
model of the virtual object at a location other than the
two-dimensional plane in the virtual space,
wherein a rendering state is switched between a first
rendering state of the virtual object and a second
rendering state of the virtual object,
wherein the first rendering state is two-dimensional dis-
play of the virtual object onto the two-dimensional
plane,
wherein the second rendering state is three-dimensional
display of the virtual object based on the three-dimen-
sional model,
wherein the rendering state is switched for a first part of
the virtual object according to a position of the first part
of the virtual object with respect to a boundary surface
in the virtual space, and
wherein a position of the virtual object is changed based
on a progress of the video content.

2. The head-mounted display according to claim 1,
wherein the circuitry controls the display to project the
virtual object of the video content obtained by render-
ing the three-dimensional model with a single virtual
camera or the video content obtained by rendering the
three-dimensional model with left and right virtual
cameras arranged based on an interocular distance,
onto the two-dimensional plane.

3. The head-mounted display according to claim 2,
wherein, in the first rendering state, the video content
further includes a background is superimposed onto the
two-dimensional plane onto which the virtual object is
projected.

4. The head-mounted display according to claim 1,
wherein the circuitry controls the display to project the
virtual object of the video content obtained by actual
imaging onto the two-dimensional plane.

5. The head-mounted display according to claim 1,
wherein the circuitry renders the virtual object and an
object different from the virtual object at the location
other than the two-dimensional plane in the virtual
space in the second rendering state.

6. The head-mounted display according to claim 1,
wherein, in the second rendering state, the video content
includes only a background projected onto the two-
dimensional plane.

7. The head-mounted display according to claim 1,
wherein the two-dimensional plane is displayed in the first
rendering state, and
wherein the two-dimensional plane is erased in the second
rendering state.

8. The head-mounted display according to claim 1,
wherein the first rendering state and the second rendering
state are switched according to a position of each part
of the virtual object in the virtual space and a position
of the two-dimensional plane as the boundary surface.

9. The head-mounted display according to claim 1,
wherein the boundary surface is determined according to
a relative position of the virtual object with respect to a user position in the virtual space, which changes
according to a user operation.

10. The head-mounted display according to claim 1,
wherein whether to perform display in the first rendering
state or the second rendering state is determined in
units of pixels of polygons constituting the three-
dimensional model.

11. The head-mounted display according to claim 1,
wherein the rendering state is switched between the first
rendering state, the second rendering state, and at least
one third rendering state for each respective part of the
virtual object.

12. An information processing method, the method com-
prising:
reproducing video content including a virtual object;
displaying the virtual object in a virtual space onto a
two-dimensional plane; and
displaying a three-dimensional model of the virtual object
at a location other than the two-dimensional plane in
the virtual space,
wherein a rendering state is switched between a first
rendering state of the virtual object and a second
rendering state of the virtual object,
wherein the first rendering state is two-dimensional dis-
play of the virtual object onto the two-dimensional
plane,
wherein the second rendering state is three-dimensional
display of the virtual object based on the three-dimen-
sional model,
wherein the rendering state is switched for a first part of
the virtual object according to a position of the first part
of the virtual object with respect to a boundary surface
in the virtual space, and
wherein a position of the virtual object is changed based
on a progress of the video content.

13. A non-transitory computer-readable storage medium
having embodied thereon a program, which when executed
by a computer causes the computer to execute an informa-
tion processing method, the method comprising:
reproducing video content including a virtual object;
displaying the virtual object in a virtual space onto a
two-dimensional plane; and
displaying a three-dimensional model of the virtual object
at a location other than the two-dimensional plane in
the virtual space,
wherein a rendering state is switched between a first
rendering state of the virtual object and a second
rendering state of the virtual object,
wherein the first rendering state is two-dimensional dis-
play of the virtual object onto the two-dimensional
plane,
wherein the second rendering state is three-dimensional
display of the virtual object based on the three-dimen-
sional model,
wherein the rendering state is switched for a first part of
the virtual object according to a position of the first part
of the virtual object with respect to a boundary surface
in the virtual space, and
wherein a position of the virtual object is changed based
on a progress of the video content.

*    *    *    *    *